US011302009B2

(12) United States Patent
Vranceanu et al.

(10) Patent No.: US 11,302,009 B2
(45) Date of Patent: Apr. 12, 2022

(54) METHOD OF IMAGE PROCESSING USING A NEURAL NETWORK

(71) Applicant: FotoNation Limited, Galway (IE)

(72) Inventors: Ruxandra Vranceanu, Brasov (RO); Tudor Mihail Pop, Brasov (RO); Oana Parvan-Cernatescu, Brasov (RO); Sathish Mangapuram, Galway (IE)

(73) Assignee: FotoNation Limited, Galway (IE)

( * ) Notice: Subject to any disclaimer, the term of this patent is extended or adjusted under 35 U.S.C. 154(b) by 158 days.

(21) Appl. No.: 16/544,238

(22) Filed: Aug. 19, 2019

(65) Prior Publication Data

US 2021/0056701 A1    Feb. 25, 2021

(51) Int. Cl.
| | |
|---|---|
| *G06T 7/11* | (2017.01) |
| *G06K 9/00* | (2006.01) |
| *G06N 3/04* | (2006.01) |
| *G06F 17/15* | (2006.01) |

(52) U.S. Cl.
CPC ............... *G06T 7/11* (2017.01); *G06F 17/15* (2013.01); *G06K 9/00248* (2013.01); *G06N 3/04* (2013.01); *G06T 2207/20081* (2013.01); *G06T 2207/20084* (2013.01); *G06T 2207/20132* (2013.01)

(58) Field of Classification Search
None
See application file for complete search history.

(56) References Cited

U.S. PATENT DOCUMENTS

| | | | |
|---|---|---|---|
| 9,786,084 B1 * | 10/2017 | Bhat | ......................... G06T 7/11 |
| 2002/0102024 A1 | 8/2002 | Jones et al. | |
| 2008/0075336 A1 * | 3/2008 | Luo | ................... G06K 9/00221 |
| | | | 382/118 |

(Continued)

FOREIGN PATENT DOCUMENTS

| | | |
|---|---|---|
| WO | 2016/083002 A1 | 6/2016 |
| WO | 2017/032468 A1 | 3/2017 |

(Continued)

OTHER PUBLICATIONS

He K, Zhang X, Ren S, Sun J, "Deep residual learning for image recognition", CoRR abs/1512.03385, URL www.//arxiv.org/abs/1512.03385, 1512.03385, 2015.

(Continued)

*Primary Examiner* — Nay A Maung
*Assistant Examiner* — Nicolas James Boyajian
(74) *Attorney, Agent, or Firm* — Lee & Hayes, P.C.

(57) ABSTRACT

A method of generating landmark locations for an image crop comprises: processing the crop through an encoder-decoder to provide a plurality of N output maps of comparable spatial resolution to the crop, each output map corresponding to a respective landmark of an object appearing in the image crop; processing an output map from the encoder through a plurality of feed forward layers to provide a feature vector comprising N elements, each element including an (x,y) location for a respective landmark. Any landmarks locations from the feature vector having an x or a y location outside a range for a respective row or column of the crop are selected for a final set of landmark locations; with remaining landmark locations tending to be selected from the N (x,y) landmark locations from the plurality of N output maps.

20 Claims, 5 Drawing Sheets

(56) References Cited

U.S. PATENT DOCUMENTS

2019/0122411 A1\* 4/2019 Sachs .................. G06T 7/248
2019/0213710 A1\* 7/2019 Roulet ................ H04N 5/3454
2020/0111214 A1\* 4/2020 Chen ..................... G06T 7/11

FOREIGN PATENT DOCUMENTS

WO      2017/108222 A1    6/2017
WO      2017/129325 A1    8/2017
WO      2019/042703 A1    3/2019

OTHER PUBLICATIONS

A. Newell, K. Yang, and J. Deng, "Stacked hourglass networks for human pose estimation", In Proceedings of the European Conference on Computer Vision, pp. 483-499. Springer, 2016.
S. Zafeiriou, G. Trigeorgis, G. Chrysos, J. Deng and J. Shen, "The Menpo Facial Landmark Localisation Challenge: A step closer to the solution", CVPRW, 2017.
W Wu, C Qian, S Yang, Q Wang, Y Cai, Q Zhou. "Look at Boundary: A Boundary-Aware Face Alignment", Proceedings of the IEEE Conference on Computer Vision & Pattern Recognition, Jun. 2018.
Petronel Bigioi and Corneliu Zaharia, U.S. Appl. No. 62/592,665, filed Nov. 30, 2017 entitled "Peripheral processing device".

\* cited by examiner

METHOD OF IMAGE PROCESSING USING A NEURAL NETWORK

FIELD

The present invention relates to a method of image processing using a neural network.

BACKGROUND

Convolutional Neural Networks (CNN) are employed for a variety of tasks including object classification, image segmentation or object detection.

Figure 1:
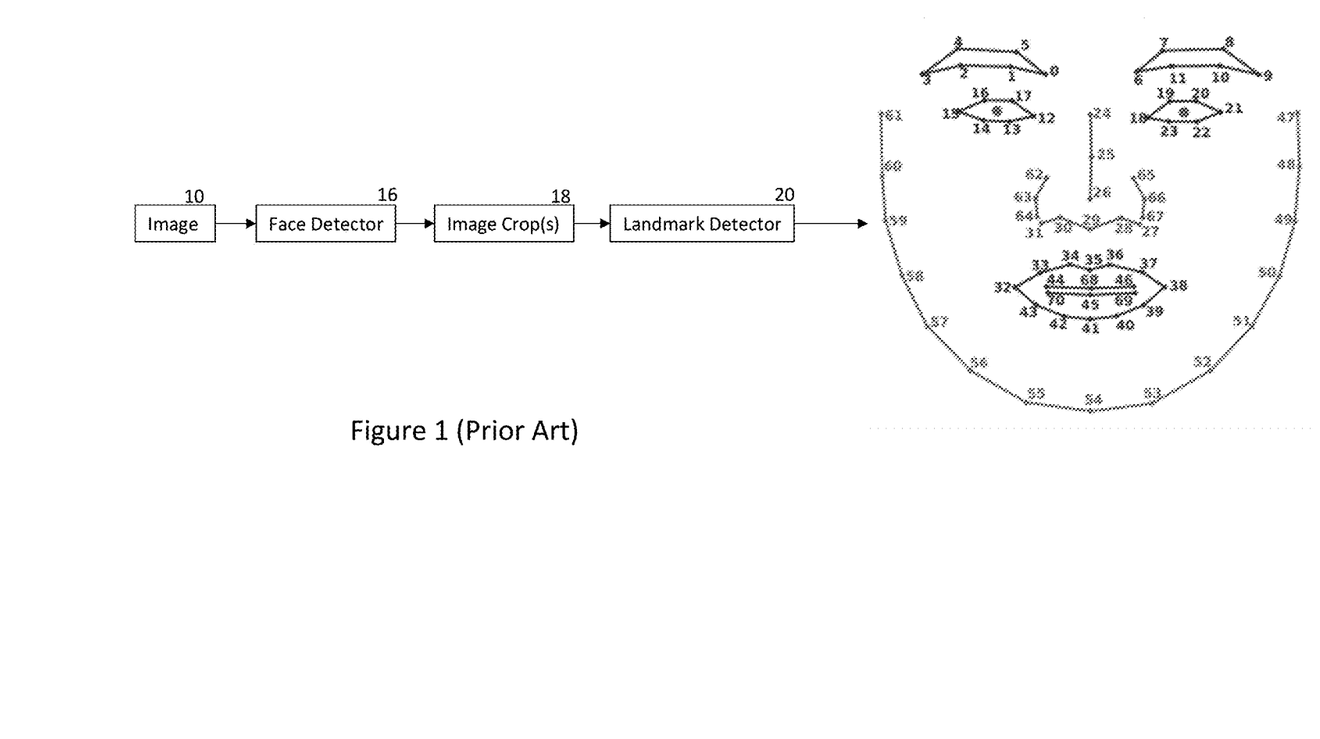
FIG. 1 shows a conventional arrangement for locating landmarks within an image.

Referring now to FIG. 1, one form of object detection comprises detection of landmarks within images or image crops comprising objects such as a face region.

So, for example, an image 10 may be acquired from a camera (not shown) of an image acquisition device. The image 10 may be provided to an object detector module such as a face detector 16 to identify within the image 10 one or more regions or image crops 18 containing a face.

Each identified image crop 18 can be fed to a landmark detector 20 which is arranged to provide x,y coordinates for a number of landmarks 1-70 within the image crop 18. As will be seen, in the example of FIG. 1, each landmark 1-70 is associated with a specific facial feature with landmarks 0-5 and 6-11 being associated with right and left eyebrow landmarks respectively; landmarks 12-17 and 18-23 being associated with right and left eye landmarks respectively; landmarks 24-31 and 62-67 being associated nose landmarks; landmarks 32-46 and 68-70 being associated mouth landmarks; and landmarks 47-61 being associated with a face contour. It will be appreciated that in other implementations, different arrangements of face landmarks can be used, for example, for faces which are detected in different poses. Also, different arrangements of landmarks can be used for different objects such as cars, animals or for assessing a pose of a person.

Once a set of landmarks has been generated for an image crop comprising, for example, a face, they can be used for a variety of applications including: face recognition, where a specific person is identified based on the spatial relationship of the located landmarks; beautification, where a face crop may be manipulated to rearrange facial features based on the location of landmarks; or even re-lighting an image based on an approximate 3D facial mesh generated from a set of located landmarks. Once such a 3D facial mesh is available, then other applications include expression tracking and artificial expression generation or animation.

It is known to employ neural networks, in particular CNNs, as landmark detectors. A processing flow for typical CNN is presented in FIG. 2. Typically, the input to the CNN is at least one 2D image/map 10 corresponding to a region of interest (ROI) from an image. The image/map(s) can comprise image intensity values only, for example, the Y plane from a YCC image; or the image/map(s) can comprise any combination of colour planes from an image; or alternatively or in addition, the image/map(s) can contain values derived from the image such as a Histogram of Gradients (HOG) map as described in PCT Application WO 2016/083002 (Ref: FN-398-PCT), the disclosure of which is incorporated by reference, or an Integral Image map. Note that images can be acquired from image sensors responsive to visible wavelengths or non-visible wavelengths such as IR or NIR wavelengths.

Figure 2:
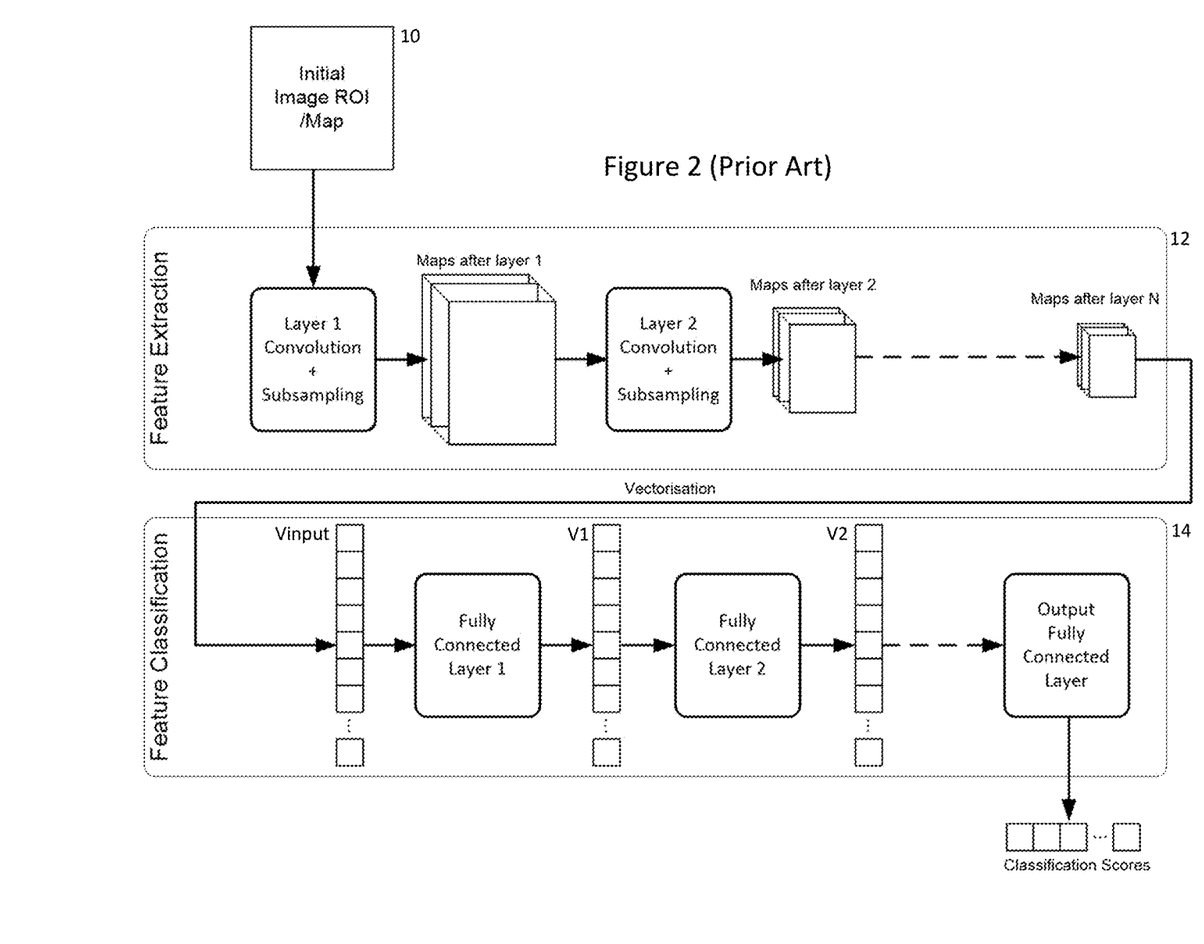
FIG. 2 shows a conventional convolutional neural network (CNN) architecture.

CNN processing typically comprises two stages:
Feature Extraction (12)—the convolutional part; and
Feature classification (14).

CNN feature extraction 12 typically comprises a number of processing layers 1 . . . N, where:
Each layer comprises a convolution followed by and activation function and optional subsampling;
Each layer produces one or (typically) more maps (sometimes referred to as channels);
The spatial resolution of the maps after each convolution layer is typically reduced by subsampling (examples of which are pooling or max-pooling), although the depth of the maps tends to increase;
A first convolution layer typically performs 2D convolution of an original 2D image/map to produce its output maps, while subsequent convolution layers can perform 3D convolution using the output maps produced by the previous layer as inputs. Nonetheless, if the input comprises say a number of maps previously derived from an image; or multiple color planes, for example, RGB or YCC for an image; or multiple versions of an image, then the first convolution layer can operate in exactly the same way as successive layers, performing a 3D convolution on the input images/maps.

In a typical classifier, the layers involved in CNN feature classification 14 are typically as follows:
The maps produced by the last convolutional layer are concatenated in a single vector (Vinput);
Vinput is the input to a multi-layer fully connected network comprising a sequence of fully connected network layers, each processing a vector input and providing a vector output;
The output of the fully connected network comprises a vector of classification scores or a feature vector representative of the input image/map(s) in accordance with the CNN training.

In the case of a landmark detector 20, the feature vector output by the final layer of such a CNN would comprise an x,y value for each landmark and possibly a confidence value for the location.

Examples of such networks include ResNet as disclosed in He K, Zhang X, Ren S, Sun J, "Deep residual learning for image recognition", CoRR abs/1512.03385, URL http://arxiv.org/abs/1512.03385, 1512.03385, 2015

In residual networks, feature map(s) produced by one convolutional layer are aggregated with feature maps produced by one or more successive convolutional layers, typically through summation, in order to improve information flow through the network. (Residual connections can also be used during the classification phase of a network.)

Training such networks is typically based on regression and they are sometimes referred to as regression networks.

Such networks are typically robust to variations of image cropping and for example do not require that all landmarks for an object are located within an image crop. Nonetheless, the accuracy (average error) provided for each landmark location may not be as good as provided by other detectors, discussed below, and it can also be difficult to get such detectors to train to accommodate for distortion of an object, for example, eye and mouth movement.

Variants of the above described regression networks comprise hourglass or encoder-decoder networks where the fully connected layers of the feature classification portion of a regression network are replaced with deconvolutional and un-pooling layers which restore the spatial resolution lost in the feature extraction (encoding) portion to provide one or more output maps corresponding in spatial resolution with the input map 10.

So, for example, in a landmark detector, a final layer of a decoder would produce a set of output maps, referred to as "heatmaps", each corresponding to a given landmark where a peak value within each output map corresponds to a best guess for the location of the landmark.

Examples of such detectors are disclosed in A. Newell, K. Yang, and J. Deng, "Stacked hourglass networks for human pose estimation", In Proceedings of the European Conference on Computer Vision, pages 483-499. Springer, 2016 first introduced a stacked hourglass architecture for pose estimation; and S. Zafeiriou, G. Trigeorgis, G. Chrysos, J. Deng and J. Shen, "The Menpo Facial Landmark Localisation Challenge: A step closer to the solution", CVPRW, 2017 which is the most recent competition for facial landmark localization where the winning solutions have been based on the hourglass architecture.

Hourglass based heatmap detectors have been found to provide good accuracy for certain landmarks and can be robust to object distortion such as eye and mouth motion. However, they are highly dependent on the image crop and for example, all landmarks should be present in the image crop or detection, otherwise detection becomes unpredictable or unreliable.

Typical solutions therefore involve enlarging the crop region within an image so that the crop region incorporates all landmarks, however, this decreases the spatial resolution of the crop and thus landmark precision, even if such landmarks are detected accurately.

W Wu, C Qian, S Yang, Q Wang, Y Cai, Q Zhou. "Look at Boundary: A Boundary-Aware Face Alignment", Proceedings of the IEEE Conference on Computer Vision & Pattern Recognition combines regression and heatmaps by first using heatmaps to determine the contours of a face and then applying a separate regression network to identify each landmark on the face contours.

SUMMARY

According to the present invention, there is provided a method of image processing using a neural network according to claim 1.

Embodiments of the present invention employ a CNN based encoder for initially extracting landmark locations from an image crop. Landmark locations that are subsequently detected as being outside the image crop using a fully connected regressor are taken in preference to landmark locations provided by a convolutional decoder.

In some embodiments, only landmark locations which correspond with groups of landmarks which tend to be prone to distortion and which are detected by the fully connected regressor as being within an image crop are taken from the convolutional decoder in preference to the fully connected regressor. Where an image crop corresponds to a face region, such locations correspond with landmarks associated with the mouth and eyes.

In these cases, landmark locations that are detected as being within an image crop by the fully connected regressor can be taken from the fully connected regressor in preference to those provided by the convolutional decoder where it is known that these are provided with increased accuracy by the fully connected regressor. Typically, these locations are less prone to distortion and tend to maintain a given spatial relationship with other landmark locations. Where an image crop corresponds to a face region, such locations correspond with landmarks associated with the jaw.

Embodiments of the invention comprise a single stage encoder-decoder network with a fully-connected regressor network connected to an output feature map provided by said encoder. However, multi-stage encoder-decoder networks could also be employed.

Such networks can be trained end-to-end or one or other branch of the network can be trained first, for example, this may comprise a legacy network, with the other branch being trained subsequently while the original network is constrained to maintain its original weights. In the case of end-to-end training of the network, this can be similar to multi-task learning, but instead of having distinct tasks such as, for example, segmentation and landmark detection, one task is landmarks from heatmaps and one is landmarks from regression, each branch of the network being trained having its own type of loss. This has the potential to help with convergence towards a better solution. Nonetheless, the hybrid network of the present application takes advantage of the strengths of both regression solutions and heatmap-based solutions while having common initial processing layers, so requiring fewer processing resources and providing faster results.

Embodiments can maximize object resolution and so the precision of landmark location by providing tight image crops to the landmark detector, but without distorting contour information for the object.

Embodiments can interoperate with a variety of object detectors, independent of their cropping style and without requiring any particular crop processing.

BRIEF DESCRIPTION OF THE DRAWINGS

An embodiment of the invention will now be described, by way of example, with reference to the accompanying drawings, in which.

DESCRIPTION OF THE EMBODIMENT

Figure 3:
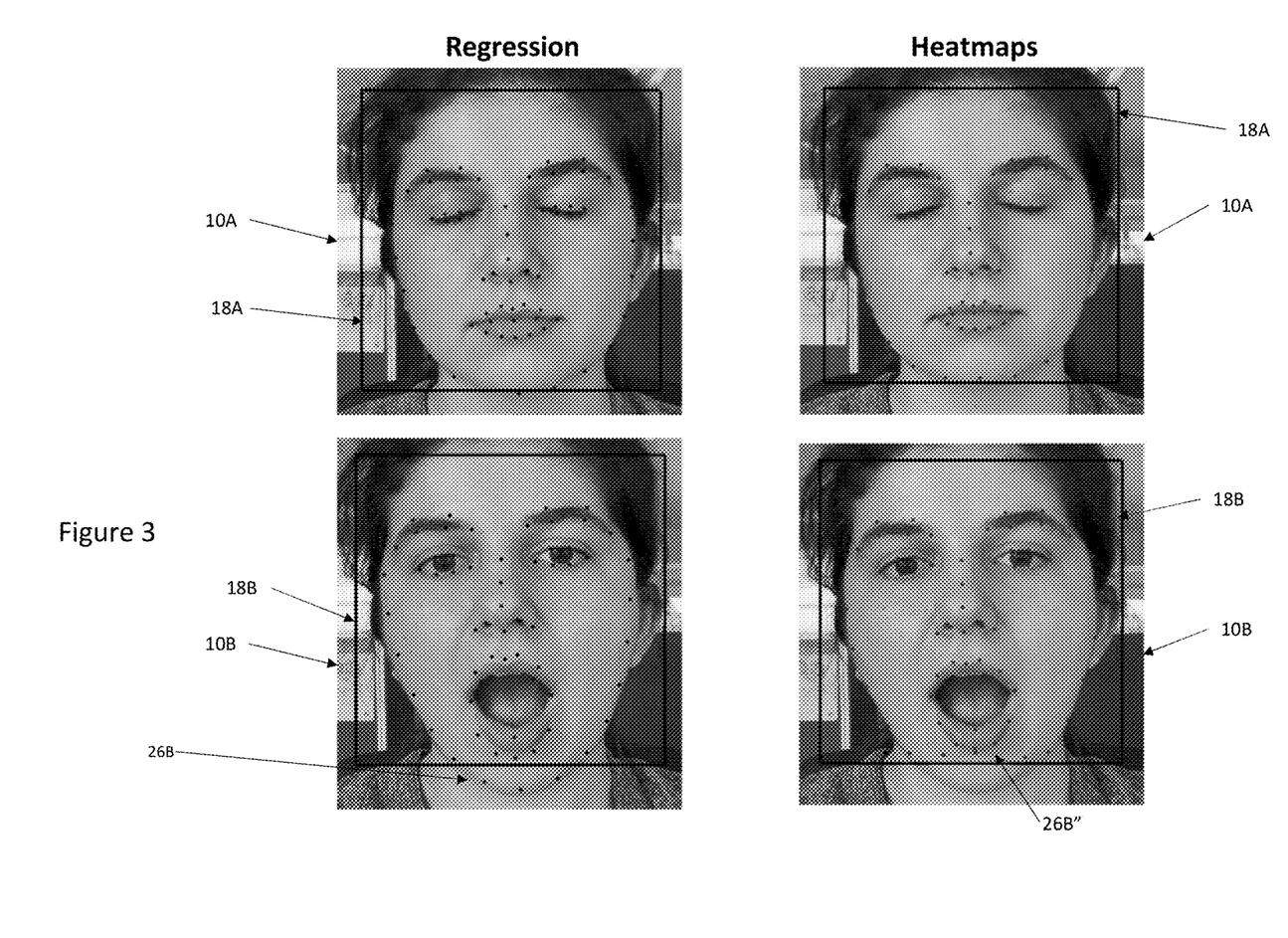
FIG. 3 shows some exemplary images processed according to an embodiment of the present invention.

Referring now to FIG. 3, there are shown a pair of duplicated images 10A (top), 10B (bottom) of the type which are to be processed according to an embodiment of the present invention. In the present example, the images include a face, however, it will be appreciated that in variants of the embodiment, images including objects other than faces can be processed.

A face detector 16 such as referred to in relation to FIG. 1 provides respective face crops 18A, 18B within images 10A, 10B. Face detection within acquired images is well-known since at least US 2002/0102024, Viola-Jones with many optimisations and improvements made in such systems since then. Thus, the face detector 16 can be a dedicated hardware module such as the engine disclosed in PCT Application WO 2017/108222 (Ref: FN-470-PCT), the disclosure of which is incorporated by reference, or the face detector can be implemented in general purpose software executing on a system CPU, or indeed the face detector 16 could be implemented using one or more convolutional neural networks (CNN) and executed on a dedicated CNN engine such as described in PCT Application WO 2017/129325 (Ref: FN-481-PCT), and U.S. Application No. 62/592,665 (Ref: FN-618-US), the disclosures of which are incorporated herein by reference. Indeed, U.S. application No. 62/592,665 (Ref: FN-618-US) discloses a system including multiple neural network processing cores which can be configured to process multiple neural networks performing different tasks on the same or different images or image portions in parallel. The face detector 16 may also provide a pose for a detected object, for example, front facing, left profile, right profile etc for a face. The region(s) 18 identified by the detector 16 need not necessarily be rectangular, but if not, as described in PCT Application WO2017/032468 (Ref: FN-469-PCT), any identified region may be scaled and rotated to provide a normalised image crop 18 comprising a rectangular array of known dimensions, for example, 64×64 pixels.

The face crops 18A, 18B will be provided to a neural network for processing according to an embodiment of the present embodiment and described in more detail below. Such networks are typically designed to operate based on fixed size input images and so any image crop needs to be sized to match the required input image size for the network. Input images are preferably kept as small as possible to maintain processing speed, but it will be appreciated that if an image crop has to be down-sampled more than necessary, then the precision provided for landmark locations by the neural network will be limited and for this reason the face crops tend to be as tightly framed as possible around a face to minimize any required down-sampling of the crop.

In the present example, the image crop provided to the neural network comprises 64×64 pixels and so when a face fitting within such a square format is detected, maximal precision can be gained. However, if a face changes proportion, such as when a subject yawns, as in image 10B, the face detector 16 may provide a crop which does not incorporate some landmarks such as those on the subject's chin.

Figure 4:
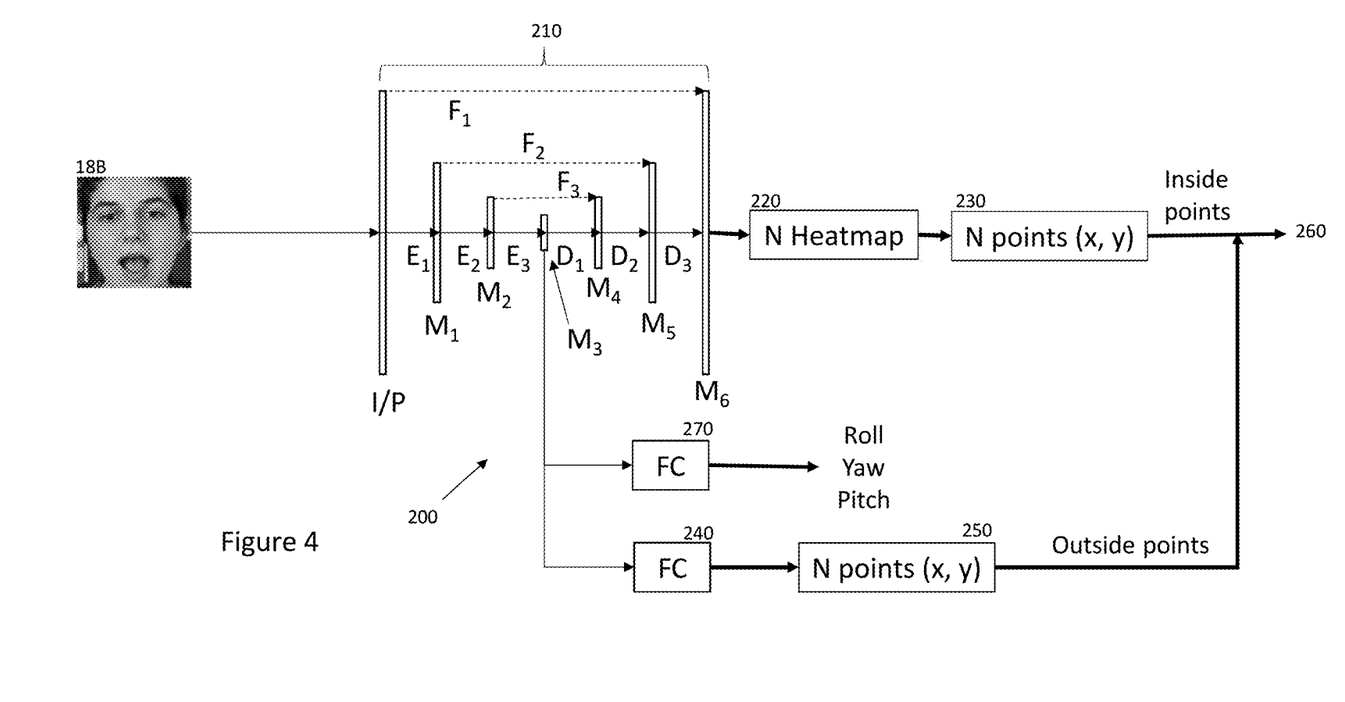
FIG. 4 shows an architecture for processing an image to provide a set of face landmarks according to an embodiment of the present invention.

Referring now to FIG. 4 which shows a neural network architecture 200 according to an embodiment of the present invention for landmark detection within an image.

The network 200 comprises a first set of layers 210 providing a single-stage encoder-decoder producing a respect heatmap 220 for each of N landmarks in an input image 10B. the encoder-decoder can be of a conventional design such as referred to above. Each landmark is extracted from its heatmap to provide a set of N (x,y) landmark locations 230 for further processing. As discussed, the x,y values for landmark locations 230 are limited to the range of the input map, in this case, 0 . . . 63.

In the encoder-decoder, a first set of encoding layers $E_1 \ldots E_3$ comprising convolutional and pooling layers produce respective output maps $M_1 \ldots M_3$ with successively decreasing spatial resolution and increasing depth, whereas a subsequent set of decoding layers $D_1 \ldots D_3$ comprising de-convolution and un-pooling layers produce respective output maps $M_4 \ldots M_6$ with successively increasing spatial resolution so that the last output map $M_6$ has a resolution corresponding with the input image crop 18B. Note that while referred to as output maps, each of output maps $M_1 \ldots M_6$ may have multiple channels. As mentioned, output map $M_6$ comprises a channel (or map) for each landmark of the set of landmarks to be located. In such encoders, it is known to provide forward-skip connections $F_1 \ldots F_3$ between encoder and decoder layers to aggregate output maps of the encoder with respective same resolution counterpart input layers for decoder layers, typically through concatenation, to improve the ability of the network to maintain the context and resolution of features extracted by the encoder layers within the subsequent decoder layers. As will be appreciated such encoder-decoders may also comprise activation functions and batch normalisation layers, however, these are not discussed in detail here.

Note that in variants of the illustrated example, fewer or more encoder/decoder layers can be used and it is also possible to employ a multi-stage encoder where a decoder output from one stage is provided as input to an encoder of a subsequent stage.

In any case, as explained, in the embodiment, it is desirable for the input to comprise a small crop so that network processing speed can be maintained and for this reason framing of the object, in this case a face, should be as tight as possible to maintain precision.

Referring back to FIG. 3, the bottom right image shows the landmarks 230 detected for image crop 18B using the encoder-decoder 210. As will be seen, the accuracy of detection for points on the mouth and eyes is quite good. However, for landmarks such as those indicated at 26B" which were in fact located outside the image crop 18B, the results provided by the encoder-decoder significantly misrepresent the contour of the face. On the other hand, the top right image shows the landmarks detected for image 10A, where all of the landmarks are in fact inside the image crop, using the encoder-decoder 210 and these are in general quite accurate.

Turning back to FIG. 4, a second branch of the network 200 comprises a number of fully connected (FC) layers 240 using as their input an output map $M_3$ (potentially comprising multiple channels) produced by the encoder layers $E_1 \ldots E_3$ of the encoder-decoder 210. In the embodiment, the lowest resolution output map $M_3$ is chosen as the input for the FC layers 240, however, it will be appreciated that in variants of this embodiment, other output maps could be used. It will also be appreciated that if a multi-stage encoder-decoder were used, then the input map could be taken from any of the stages.

The FC layers 240 produce an output feature vector 250 where each of the N elements of the vector comprises an (x,y) location for a respective landmark. Note that as discussed, the x,y values for landmark locations 250 are not limited to the range of the input map, in this case, 0 . . . 63.

It will be appreciated that the additional processing required for the FC layers 240, by comparison to using an encoder-decoder 210 alone is minimal and so the resource overhead required to implement the network 200 is not significant.

It will also be seen that an existing pre-trained encoder-decoder 210 could be employed with the weights for this branch of the network locked when training the additional FC layers 240. Alternatively, if starting with an existing regression network comprising encoding layers $E_1 \ldots E_3$ and FC layers 240, their weights could be locked when training the decoder layers $D_1 \ldots D_3$. Alternatively, the entire network could be trained end-to-end.

In any case, referring back to FIG. 3, the bottom left image shows the landmark locations 250 produced by the FC layers 240 for image crop 18B. Here, it will be seen that the predictions for landmarks 26B located outside the image crop 18B are quite good, whereas the accuracy for landmarks located around the lower mouth and some eye features in particular is not as good as for the set of landmark locations 230 produced by the encoder-decoder 210 for the image 10B. It can also be seen from the top left image that the accuracy for landmarks located around the subject's left eye in image 10A produced by the FC layers 204 is not as good as for the corresponding landmark locations produced by the encoder-decoder 210 for image 10A.

In embodiments of the present invention, the sets of landmark locations 230 and 250 produced by the encoder-decoder 210 and FC layers 240 respectively from a given image crop 18 are combined to provide a final set of landmark locations 260 for the object.

In one embodiment, where the landmark location for a landmark produced by the FC layers 240 includes an x or a y value outside the range of the image crop, this location is chosen for the final set of landmark locations 260.

In some embodiments, all of the remaining landmark locations can be chosen from the landmark locations 230 generated by the encoder-decoder.

However, in some embodiments, there may be an appreciation that the FC layers 240 produce more accurate results for some landmarks that appear within the image crop 18. These typically tend to be landmarks which are less prone to distortion, for example, face contour landmarks 47-61 from FIG. 1.

While in the above embodiment, choosing landmark locations from either the landmark locations 230 or 250 is performed algorithmically, it will be appreciated that the output maps 220 or just the landmark locations 230 and the feature vector comprising the landmark locations 250 could also be provided to further neural network layers (not shown) for fusing these locations into the final set of landmark locations 260, and where the network layers would be trained so as to favour landmark locations produced by the FC layers 240 with an x or a y value outside the range of the image crop 18 and to favour landmark locations produced by the encoder-decoder 210 otherwise. This could be particularly useful for locations around an image crop boundary or where the accuracy of each approach varies for landmark locations within the image crop 18, so that the landmark locations generated in the final set of landmark locations 260 could be a fusion of the information from landmark locations 230 and 250.

It will also be appreciated that because the additional cost of adding FC layers to an encoder-decoder network is relatively low, the network architecture 200 can be extended to perform other tasks. So, for example, as shown in FIG. 4, a further set of FC layers 270 can use an output layer from the encoding layers $E_1 \ldots E_3$ to generate indicators of pitch, yaw and roll for the object within the image crop. This meta-information can be useful for subsequent processing.

While the embodiment above has been described in terms of providing fully connected layers 240, 270, it will be appreciated that these layers need not exclusively comprise fully connected layers and may for example include some convolutional or other layers forming what may be more generally described as a feed forward network.

Figure 5:
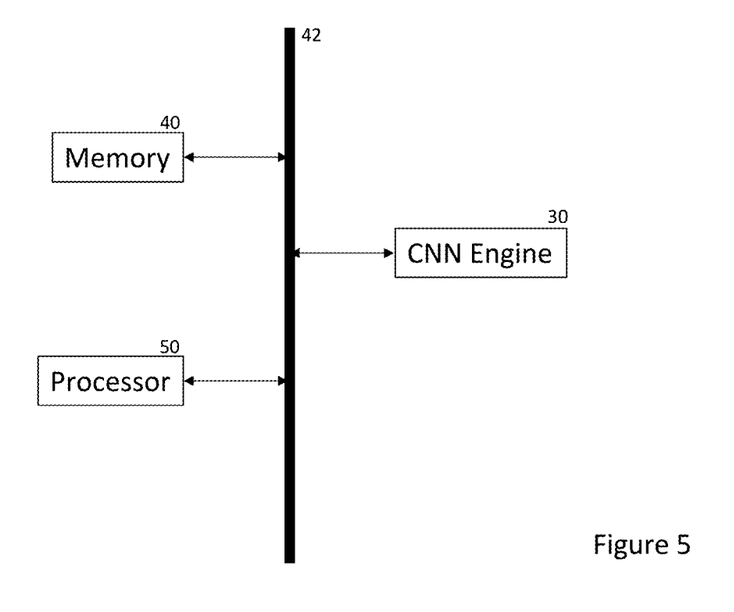
FIG. 5 show a system for executing the architecture of FIG. 4.

It will be appreciated that the neural network architecture 200 of FIG. 4 can be executed on any suitable processor. So referring to FIG. 5, an image acquired by a camera image sensor and typically pre-processed by an image processing pipeline (not shown) is written to main memory 40 across a system bus 42. The weights and network configuration for the network 200 may also be stored in main memory 40. Thus, the network 200 can be executed by general purpose software executing on a system CPU 50, or indeed the network could be implemented using one or more convolutional neural networks (CNN) and executed on a dedicated CNN engine 30 such as described in PCT Application WO 2017/129325 (Ref: FN-481-PCT), and U.S. Application No. 62/592,665 (Ref: FN-618-US), the disclosures of which are incorporated herein by reference. Indeed, PCT Application WO2019/042703 (Ref: FN-618-PCT) discloses a system including multiple neural network processing cores which can be configured to process multiple neural networks performing different tasks on the same or different images or image portions in parallel. In these cases, the weights and network configuration can be pre-loaded within the CNN engine 30. In any case, with a multi-processor core, the decoding layers $D_1 \ldots D_3$ could be executed at the same time as the FC layers 240 (and possibly FC layers 270) to provide results with minimal latency.

The invention claimed is:

1. A method comprising:
   identifying an object within an image;
   generating a crop comprising at least a portion of said object;
   processing said crop by one or more convolutional layers to provide an output map of lower spatial resolution than said crop;
   processing said output map by one or more de-convolutional layers to provide N output maps of comparable spatial resolution to said crop, each N output map of said N output maps corresponding to a respective landmark of said object;
   obtaining N landmark locations from said N output maps output by the one or more de-convolutional layers;
   processing said output map by one or more layers different from the one or more de-convolutional layers to provide a feature vector comprising (x,y) locations for multiple landmarks;
   selecting a first set of landmark locations from the multiple landmarks of said feature vector, at least some of the first set of landmark locations being outside a boundary of said crop; and
   selecting a second set of landmark locations from said N landmark locations associated with the N output maps.

2. The method according to claim 1, wherein the second set of landmark locations represents locations comprising distortion relative to the first set of landmark locations.

3. The method according to claim 1, wherein the first set of landmark locations selected from said feature vector do not comprise distortion relative to said crop.

4. The method according to claim 1, further comprising processing said output map by one or more feed forward layers to provide a classification of at least one of: pitch, yaw, or roll of said object within said crop.

5. The method according to claim 1, wherein said one or more convolutional layers and said one or more de-convolutional layers are associated with a single stage encoder-decoder.

6. The method according to claim 1, wherein said output map from a first convolutional layer is aggregated with an output map of said N output maps from a first de-convolutional layer to provide an input map for a second convolutional layer.

7. The method according to claim 1, wherein said object comprises a face.

8. The method according to claim 1, wherein said crop comprises a range of 64×64 pixels.

9. The method according to claim 1, wherein processing said crop or processing said output map comprises execution by at least one of: a general-purpose processor; a multi-core processor; a dedicated neural network processing engine; or a multi-core neural network processing engine.

10. The method of claim 1, wherein the output map comprises a plurality of channels.

11. The method of claim 1, further comprising feeding said N output maps and said feature vector through a set of neural network layers to provide said first set of landmark locations or said second set of landmark locations.

12. A system comprising:
one or more processors; and
one or more non-transitory computer-readable media storing instructions executable by the one or more processors, wherein the instructions, when executed, cause the system to perform operations comprising:
identifying an object within an image;
generating a crop comprising at least a portion of said object;
processing said crop by one or more convolutional layers to provide an output map of lower spatial resolution than said crop;
processing said output map by one or more de-convolutional layers to provide N output maps having substantially similar resolution to said crop, at least one N output map of said N output maps corresponding to a landmark of said object;
obtaining N landmark locations from said N output maps output by the one or more de-convolutional layers;
processing said output map by one or more layers different from the one or more de-convolutional layers to provide a feature vector comprising (x, y) locations for multiple landmarks;
selecting a first set of landmark locations from the multiple landmarks of said feature vector, at least some of the first set of landmark locations being outside a boundary of said crop; and
selecting a second set of the landmark locations from said N landmark locations associated with the N output maps.

13. The system of claim 12, the operations further comprising:
training a neural network based at least in part on the first set of landmark locations and the second set of landmark locations.

14. The system of claim 12, the operations further comprising:
generating, by a neural network, an additional crop associated with an additional image based at least in part on the first set of landmark locations and the second set of landmark locations.

15. The system of claim 12, wherein the second set of landmark locations represents locations comprising distortion relative to the first set of landmark locations.

16. The system of claim 12, wherein the first set of landmark locations selected from said feature vector do not comprise distortion relative to said crop.

17. The system of claim 12, wherein said object comprises a face.

18. The system of claim 12, wherein said one or more convolutional layers and said one or more de-convolutional layers are associated with a single stage encoder-decoder.

19. The method of claim 1, further comprising:
training a neural network based at least in part on the first set of landmark locations and the second set of landmark locations.

20. The method of claim 1, further comprising:
generating, by a neural network, an additional crop associated with an additional image based at least in part on the first set of landmark locations and the second set of landmark locations.

* * * * *

UNITED STATES PATENT AND TRADEMARK OFFICE
CERTIFICATE OF CORRECTION

PATENT NO. : 11,302,009 B2
APPLICATION NO. : 16/544238
DATED : April 12, 2022
INVENTOR(S) : Ruxandra Vranceanu et al.

It is certified that error appears in the above-identified patent and that said Letters Patent is hereby corrected as shown below:

In the Claims

Column 9, Line 31, Claim 12 change "the landmark" to -- landmark --.

Signed and Sealed this
Thirteenth Day of September, 2022

Katherine Kelly Vidal
*Director of the United States Patent and Trademark Office*